US007554512B2

(12) United States Patent
Steer

(10) Patent No.: US 7,554,512 B2
(45) Date of Patent: Jun. 30, 2009

(54) ELECTROLUMINESCENT DISPLAY DEVICES

(75) Inventor: William A. Steer, Stanmore (GB)

(73) Assignee: TPO Displays Corp. (TW)

( * ) Notice: Subject to any disclaimer, the term of this patent is extended or adjusted under 35 U.S.C. 154(b) by 532 days.

(21) Appl. No.: 10/530,268

(22) PCT Filed: Sep. 15, 2003

(86) PCT No.: PCT/IB03/04026

§ 371 (c)(1),
(2), (4) Date: Apr. 5, 2005

(87) PCT Pub. No.: WO2004/034364

PCT Pub. Date: Apr. 22, 2004

(65) Prior Publication Data

US 2006/0066622 A1 Mar. 30, 2006

(30) Foreign Application Priority Data

Oct. 8, 2002 (GB) ................................ 0223304.7

(51) Int. Cl.
*G06F 15/16* (2006.01)

(52) U.S. Cl. ........................................................ 345/76

(58) Field of Classification Search .................... 345/76
See application file for complete search history.

(56) References Cited

U.S. PATENT DOCUMENTS

| | | | | |
|---|---|---|---|---|
| 5,949,194 | A * | 9/1999 | Kawakami et al. | 315/169.4 |
| 6,097,360 | A * | 8/2000 | Holloman | 345/84 |
| 6,288,696 | B1 * | 9/2001 | Holloman | 345/84 |
| 6,351,078 | B1 | 2/2002 | Wang et al. | |
| 6,359,605 | B1 * | 3/2002 | Knapp et al. | 345/76 |
| 2002/0126073 | A1 * | 9/2002 | Knapp et al. | 345/76 |
| 2003/0020413 | A1 * | 1/2003 | Oomura | 315/169.3 |
| 2003/0090446 | A1 * | 5/2003 | Tagawa et al. | 345/76 |
| 2004/0120094 | A1 * | 6/2004 | Satoh | 361/160 |

FOREIGN PATENT DOCUMENTS

| | | | |
|---|---|---|---|
| EP | 0717446 | A2 | 6/1996 |
| WO | WO9636959 | A2 | 11/1996 |

* cited by examiner

*Primary Examiner*—Bipin Shalwala
*Assistant Examiner*—Afroza Y Chowdhury
(74) *Attorney, Agent, or Firm*—Raymond J. Ho; Morris Manning & Martin

(57) ABSTRACT

An active matrix electroluminescent display device has a current sampling resistor within each pixel in series with the display element. A feedback signal represents the voltage drop across the current sampling resistor and the pixel drive signals are modified in dependence on the feedback signal to control the current driven through the display element. In this way, threshold compensation is provided, whilst enabling a single voltage-driven drive transistor to be employed.

15 Claims, 4 Drawing Sheets

ELECTROLUMINESCENT DISPLAY DEVICES

BACKGROUND OF THE INVENTION (1) Field of the Invention

This invention relates to electroluminescent display devices, particularly active matrix display devices having thin film switching transistors associated with each pixel.

(2) Description of Related Art

Matrix display devices employing electroluminescent, light-emitting, display elements are well known. The display elements may comprise organic thin film electroluminescent elements, for example using polymer materials, or else light emitting diodes (LEDs) using traditional III-V semiconductor compounds. Recent developments in organic electroluminescent materials, particularly polymer materials, have demonstrated their ability to be used practically for video display devices. These materials typically comprise one or more layers of a semiconducting conjugated polymer sandwiched between a pair of electrodes, one of which is transparent and the other of which is of a material suitable for injecting holes or electrons into the polymer layer.

The polymer material can be fabricated using a CVD process, or simply by a spin coating technique using a solution of a soluble conjugated polymer. Ink-jet printing may also be used. Organic electroluminescent materials exhibit diode-like I-V properties, so that they are capable of providing both a display function and a switching function, and can therefore be used in passive type displays. Alternatively, these materials may be used for active matrix display devices, with each pixel comprising a display element and a switching device for controlling the current through the display element.

Display devices of this type have current-driven display elements, so that a conventional, analogue drive scheme involves supplying a controllable current to the display element. It is known to provide a current source transistor as part of the pixel configuration, with the gate voltage supplied to the current source transistor determining the current through the display element. A storage capacitor holds the gate voltage after the addressing phase.

FIG. 1 shows a known pixel circuit for an active matrix addressed electroluminescent display device. The display device comprises a panel having a row and column matrix array of regularly-spaced pixels, denoted by the blocks 1 and comprising electroluminescent display elements 2 together with associated switching means, located at the intersections between crossing sets of row (selection) and column (data) address conductors 4 and 6. Only a few pixels are shown in the Figure for simplicity. In practice there may be several hundred rows and columns of pixels. The pixels 1 are addressed via the sets of row and column address conductors by a peripheral drive circuit comprising a row, scanning, driver circuit 8 and a column, data, driver circuit 9 connected to the ends of the respective sets of conductors.

The electroluminescent display element 2 comprises an organic light emitting diode, represented here as a diode element (LED) and comprising a pair of electrodes between which one or more active layers of organic electroluminescent material is sandwiched. The display elements of the array are carried together with the associated active matrix circuitry on one side of an insulating support. Either the cathodes or the anodes of the display elements are formed of transparent conductive material. The support is of transparent material such as glass and the electrodes of the display elements 2 closest to the substrate may consist of a transparent conductive material such as ITO so that light generated by the electroluminescent layer is transmitted through these electrodes and the support so as to be visible to a viewer at the other side of the support. Typically, the thickness of the organic electroluminescent material layer is between 100 nm and 200 nm. Typical examples of suitable organic electroluminescent materials which can be used for the elements 2 are known and described in EP-A-0 717446. Conjugated polymer materials as described in WO96/36959 can also be used.

FIG. 2 shows in simplified schematic form a known pixel and drive circuitry arrangement for providing voltage-programmed operation. Each pixel 1 comprises the EL display element 2 and associated driver circuitry. The driver circuitry has an address transistor 16 which is turned on by a row address pulse on the row conductor 4. When the address transistor 16 is turned on, a voltage on the column conductor 6 can pass to the remainder of the pixel. In particular, the address transistor 16 supplies the column conductor voltage to a current source 20, which comprises a drive transistor 22 and a storage capacitor 24. The column voltage is provided to the gate of the drive transistor 22, and the gate is held at this voltage by the storage capacitor 24 even after the row address pulse has ended. The drive transistor 22 draws a current from the power supply line 26.

The drive transistor 22 in this circuit is implemented as a PMOS TFT, so that the storage capacitor 24 holds the gate-source voltage fixed. This results in a fixed source-drain current through the transistor, which therefore provides the desired current source operation of the pixel.

The above basic pixel circuit is a voltage-programmed pixel, and there are also current-programmed pixels which sample a drive current. However, all pixel configurations require current to be supplied to each pixel.

One problem with voltage-programmed pixels, particularly using polysilicon thin film transistors, is that different transistor characteristics across the substrate (particularly the threshold voltage) give rise to different relationships between the gate voltage and the source-drain current, and artefacts in the displayed image result.

It has been recognised that a current-programmed pixel can reduce or eliminate the effect of transistor variations across the substrate. For example, a current-programmed pixel can use a current mirror to sample the gate-source voltage on a sampling transistor through which the desired pixel drive current is driven. The sampled gate-source voltage is used to address the drive transistor. This partly mitigates the problem of uniformity of devices, as the sampling transistor and drive transistor are adjacent each other over the substrate and can be more accurately matched to each other. Another current sampling circuit uses the same transistor for the sampling and driving, so that no transistor matching is required, although additional transistors and address lines are required.

A further problem with LED displays arises from the significant currents drawn by the pixels. The displays are typically backward-emitting, through the substrate carrying the active matrix circuitry. This is the preferred arrangement because the desired cathode material of the EL display element is opaque, so that the emission is from the anode side of the EL diode, and furthermore it is not desirable to place this preferred cathode material against the active matrix circuitry. Metal row conductors are formed to define power supply lines, and for these backward emitting displays they need to occupy the space between display areas, as they are opaque. For example, in a 12.5 cm (diagonal) display, which is suitable for portable products, the row conductor may be approximately 11 cm long and 20 μm wide. For a typical metal sheet resistance of 0.2 Ω/square, this gives a line resistance for a metal row conductor of 1.1 kΩ. A bright pixel may draw around 8 μA and the current drawn is distributed along the row. The significant row conductor resistance gives rise to voltage drops along the row conductors, and these voltage variations along the power supply line alter the gate-source voltage on the drive transistors, and thereby affect the brightness of the display. Furthermore, as the currents drawn by the pixels in the row are image-dependent, it is difficult to correct the pixel drive levels by data correction techniques, and the distortion is essentially a cross talk between pixels in different columns.

The voltage drops can be reduced by a factor of 4 by drawing current from both ends of the row, and improvements in efficiency of the EL materials can also reduce the current drawn. Nevertheless significant voltage drops are still present. These voltage drops also give rise to performance limitations in current mirror pixel circuits, and thin film transistors are inherently non-ideal current source devices (the output current will in fact depend on both the source and drain voltages rather than only on the gate-source voltage).

SUMMARY OF THE INVENTION

According to the invention, there is provided an active matrix electroluminescent display device comprising an array of display pixels, each pixel comprising:

an electroluminescent (EL) display element;

a drive transistor for driving a current through the display element;

a current sampling resistor, wherein the EL display element, the drive transistor and the current sampling resistor are in series between first and second power lines; and circuitry for providing a feedback signal or signals representing the voltage drop across the current sampling resistor to at least one feedback line, wherein the display device further comprises processing means for processing pixel drive signals in dependence on the feedback signal or signals.

In this arrangement, feedback is used to control the current driven through the display element. This provides transistor threshold compensation whilst enabling a single voltage-driven drive transistor to be employed.

The circuitry for providing a feedback signal or signals may comprise a first sampling transistor connected between one terminal of the current sampling resistor and a first feedback line. If the feedback line is connected to high input impedance circuitry, the minimal current will flow, and the transistor provides a voltage probe function. One voltage probe will be sufficient to determine the voltage drop if one terminal of the resistor is at a known fixed potential. Otherwise, a second sampling transistor can be connected between the other terminal of the current sampling resistor and a second feedback line.

Each pixel may further comprises an address transistor, connected between a data input line and the gate of the drive transistor and the gates of the address transistor and the or each sampling transistor are controlled by a shared address line. This simplifies the control of the pixel, and synchronises the driving of the pixel with the feedback function.

Each pixel may further comprise a second address transistor, which is connected between the one terminal of the current sampling resistor and a current drain line. This second address transistor enables the display element to be bypassed and enables a known current to be driven through the current sampling resistor. This enables a calibration operation to be carried out so that tolerances in the resistance can be accommodated.

The second address transistor can also be controlled by the shared address line, and the current drain line can then be used to determine whether or not the display element is bypassed during the addressing phase.

In one example (with no calibration for resistance variations) the processing means comprises a first amplifier which receives the feedback signal or signals and derives therefrom an output dependent on the current flowing through the current sampling resistor, and a second amplifier which receives the output dependent on the current flowing through the current sampling resistor and the pixel drive signal and provides a modified pixel drive signal. This provides a feedback mechanism which stabilizes when the modified pixel drive signal gives rise to the desired current through the current sampling resistor. The feedback scheme takes account of the different characteristics of the pixel drive transistor.

In another example (with calibration for resistance variations) the processing means comprises a first amplifier which receives the feedback signal or signals and derives therefrom an output dependent on the current flowing through the current sampling resistor, a sample and hold circuit for holding the output value, and a second amplifier for receiving the held output value and the output dependent on the current flowing through the current sampling resistor.

In this arrangement, the voltage drop across the resistor for a known current is used to obtain a value which is stored by a sample and hold circuit. This is used as a reference value for a second amplifier when driving the pixel. The data input line can be switchable between a power supply line voltage and the output of the second amplifier. When the data input line is switched to the power supply line, the sample and hold operation can be carried out without driving the EL display element. When the data input line is switched to the output of the second amplifier, the EL display element is driven with feedback control.

The device is thus operable in two modes:

a first mode in which a desired pixel drive current is driven through the current sampling resistor and the second address transistor to the current drain line, and the output dependent on the current flowing through the current sampling resistor is stored; and a second mode in which a current is driven through the drive transistor and the EL display element and the output dependent on the current flowing through the current sampling resistor is provided to the second amplifier for comparison with the stored output value, the second amplifier providing the data input line voltage.

In one aspect, the invention also provides a method of addressing an active matrix electroluminescent display device comprising an array of display pixels, in which each pixel comprises an electroluminescent (EL) display element, a drive transistor for driving a current through the display element and a current sampling resistor in series with the EL display element and the drive transistor, the method comprising, for each pixel:

applying a drive signal to the pixel representing a desired current;

obtaining a feedback signal representing the current flowing through the display element by sampling a voltage on the terminals of a resistor in series with the EL display element; and using the drive signal and the feedback signal to generate a modified pixel drive signal such that the current flowing is equal to the desired current.

This method uses feedback to produce a desired current through the display element, based on a known resistance value.

In another aspect, the invention provides a method of addressing an active matrix electroluminescent display device comprising an array of display pixels, in which each pixel comprises an electroluminescent (EL) display element, a drive transistor for driving a current through the display element and a current sampling resistor in series with the EL display element and the drive transistor, the method comprising, for each pixel:

driving a desired current through the current sampling resistor and not through the display element;

obtaining a feedback signal representing the corresponding voltage drop across the current sampling resistor;

storing the feedback signal; and using the stored feedback signal as a feedback control signal for subsequently driving current through the display element by applying a voltage to the gate of the drive transistor, the feedback control signal being used to determine the gate voltage.

This method again uses feedback to produce a desired current through the display element, but allows tolerance differences in the resistance value.

BRIEF DESCRIPTION OF THE DRAWINGS

The invention will now be described by way of example with reference to the accompanying drawings, in which.

DETAILED DESCRIPTION OF THE INVENTION

Figure 1:
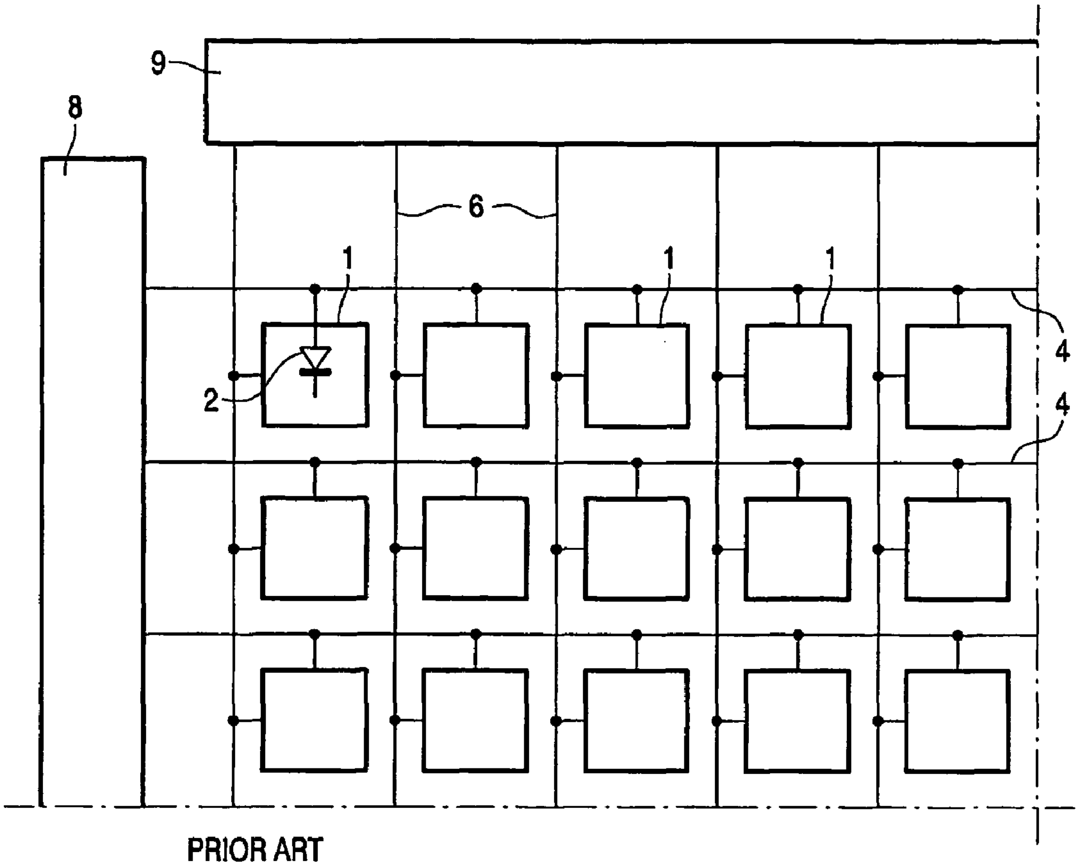
PRIOR ART FIG.1
FIG. 1 shows a known EL display device.

The invention provides an active matrix electroluminescent display device in which a current sampling resistor is provided within each pixel in the main current path of the display element. This enables a feedback signal derived from the current through the resistor (and therefore the display element) to be used to control the pixel drive.

The same reference numerals are used in different figures for the same components, and description of these components will not be repeated.

Figure 2:
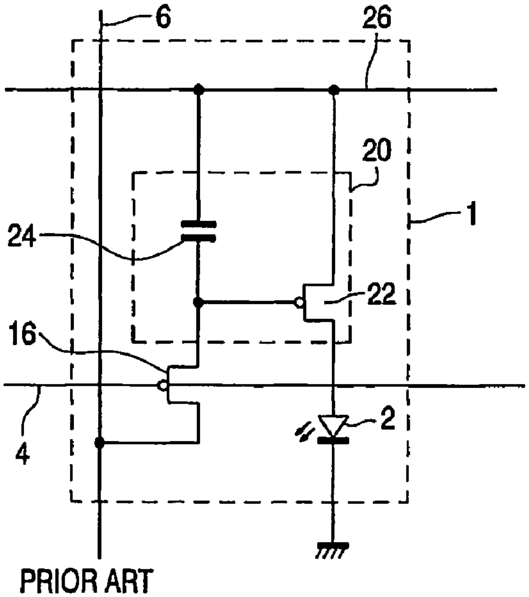
PRIOR ART FIG.2
FIG. 2 is a schematic diagram of a known pixel circuit for current-addressing the EL display pixel using an input drive voltage.
Figure 3:
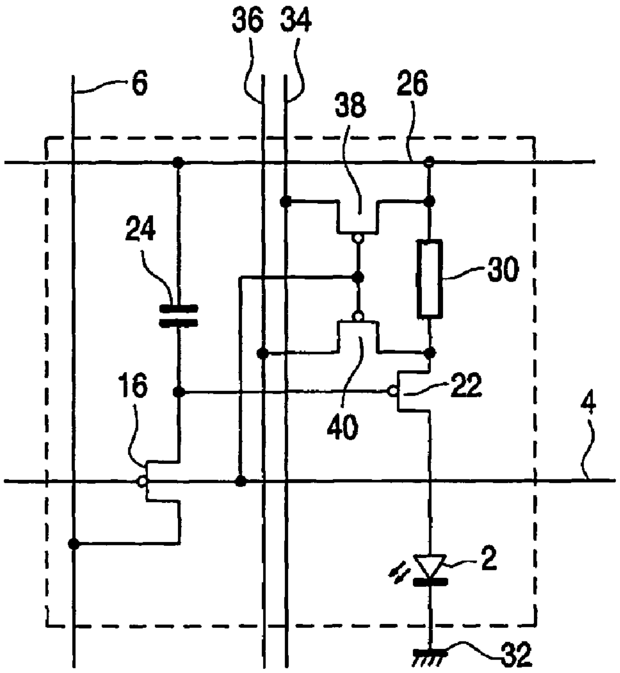
FIG. 3 shows a schematic diagram of a first example of pixel layout for a display device of the invention.

FIG. 3 shows a first pixel arrangement in accordance with the invention. As in the conventional pixel of FIG. 2, the pixel is voltage-addressed, and a storage capacitor 24 holds the voltage on the gate of the drive transistor 22 after the pixel addressing phase.

A current sampling resistor 30 is placed in series with the drive transistor 22 and the display element 2, so that they are all arranged in series between the power supply line 26 and the ground terminal 32. The voltage at each end of the resistor 30 is tapped to a respective feedback line 34, 36. By tapping the voltages at each end of the resistor 30, two feedback signals are provided, which together can be used to obtain the voltage drop across the resistor 30. The current flowing can then be calculated based on the known resistance of the resistor 30.

The feedback lines 34, 36 are coupled to a high input impedance differential amplifier (as will be explained further below) so that negligible current is drawn. Each end of the resistor 30 is tapped to the feedback line through a respective sampling transistor 38, 40. These transistors are operated as switches, enabling the feedback lines 34, 36 to act as voltage probes.

In this pixel circuit, the sampling transistors 38, 40 provide a four-point probe operation enabling a feedback signal to be derived which is dependent upon the current flowing through the resistor 30. This feedback signal is then used to modify the data provided on the column conductor 6 until an equilibrium is reached at which the gate voltage for the drive transistor 22 corresponds to the desired current flow through the resistor 30 and therefore through the display element 2. This equilibrium is reached during the addressing phase, and the gate voltage for the drive transistor is subsequently held by the storage capacitor 24 during the rest of the frame period. The voltage provided on the column conductor 6 is derived from a comparison of the measured current through the current sampling resistor 30 and a desired current level, "Luminance input", which is provided at the input to the column driver.

This arrangement provides the feedback programming of the gate voltage for the drive transistor 22 under exactly the same electrical environment as during subsequent drive of the pixel. This improves the programming of pixel intensities. An analogue desired current (i.e. brightness level) is used to program the pixel, and this permits easy gamma-curve correction. As shown in FIG. 3, the sampling transistors 38, 40 as well as the address transistor 16 and the drive transistor 22 may each be implemented as PMOS TFTs. This enables simple implementation of the additional pixel components.

Figure 4:
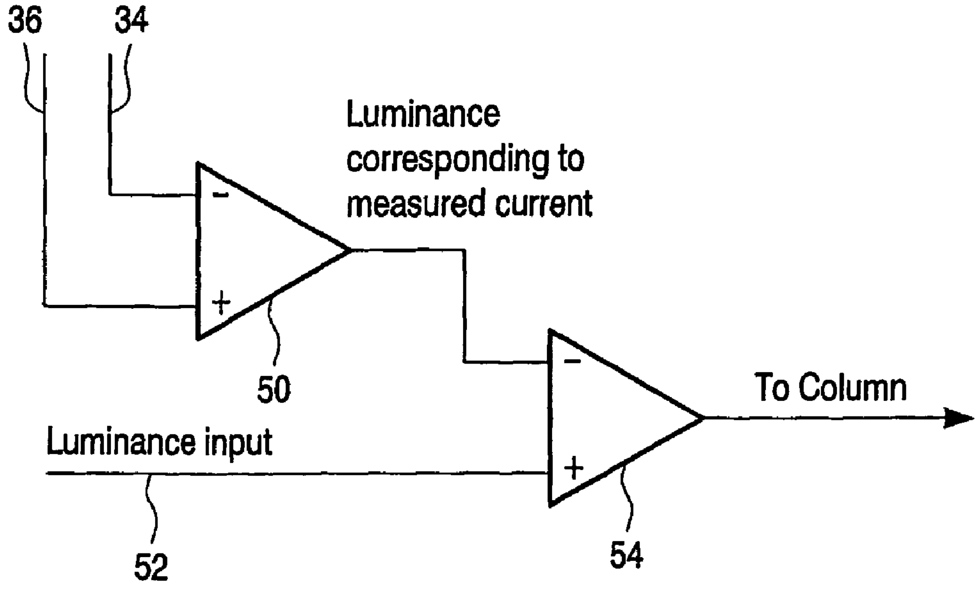
FIG. 4 shows the column driver architecture for a display using the pixel of FIG. 3.

FIG. 4 shows how the feedback signals are used to implement a feedback control loop which controls the voltage applied to the gate of the drive transistor 22.

As shown, the two voltage probe feedback signals are provided to a high input impedance differential amplifier 50, the output of which is dependent on the difference between the voltages on the two ends of the current sampling resistor 30, and therefore dependent upon the current flowing through the current sampling resistor 30. The amplifier 50 has low to moderate gain. The gain of the differential amplifier 50 is selected depending upon the resistance value of the current sampling resistor 30, such that the output represents a luminance value in the same way that the input signal 52 represents a desired luminance value. A second high gain differential amplifier 54 compares the measured luminance with the desired luminance, and the output of the differential amplifier 54 is provided to column 6 to drive the drive transistor 22. An equilibrium is reached in the circuit of FIG. 4 when the output for the column 6 is a gate voltage for the drive transistor 22 which gives rise to a luminance corresponding to that provided on the input 52.

This arrangement requires current sampling resistors 30 for each pixel with high accuracy, for example 1% accuracy. Furthermore, to provide sufficient voltage drop for the differential amplifier 50, a high resistance value is desired, for example in excess of 50 kΩ. These resistors need to be fabricated within the area of each pixel. Such resistors can be produced using current technology. For example, they may be fabricated in polysilicon, with a surface resistivity of 1-2 kΩ/square, with a minimum width of about 5 μm. A 200 μm long resistor would then have a value of around 50 kΩ, giving a 50 mV drop for 1 μA current. Higher value resistors could be made, which would reduce the demands on the driver circuitry of FIG. 4, but this would be at the expense of accuracy and uniformity.

Figure 5:
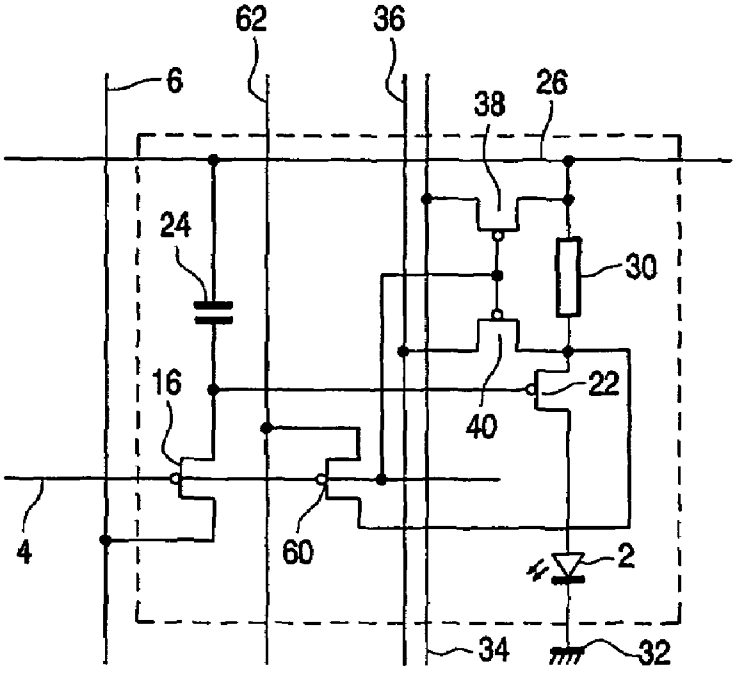
FIG. 5 shows a schematic diagram of a second example of pixel layout for a display device of the invention.

FIG. 5 shows a modification to the pixel circuit of FIG. 3 which enables differences in the resistance of the current sampling resistor 30 to be tolerated. In the circuit of FIG. 5, a second address transistor 60 is provided, connected between one terminal of the current sampling resistor 30 and a current drain line 62. Thus, a path is provided between the voltage supply line 26 and the current drain line 62, through the current sampling resistor 30 and the second address transistor 60 in series. The current drain line 62 is used to force a known current through the current sampling resistor 30, whilst bypassing the display element 2. By drawing a known current through the current sampling resistor 30, a calibration step can be carried out, so that the resistance of the current sampling resistor 30 is effectively being measured.

As shown in FIG. 5, the second address transistor 60 is controlled by the same control line 4 as the first address transistor 16 and the first and second sampling transistors 38, 40. Thus, in the circuits of both FIGS. 3 and 5, the additional transistors are controlled synchronously with the first address transistor 16.

In the circuit of FIG. 5, the current through the current sampling resistor 30 is routed either through the drive transistor 22 and the display element 2 (during pixel driving) or else through the current sampling resistor 30 and the second address transistor 60 (during calibration). To control which of these current paths is used, the voltage on the column conductor 6 can be switched between the data voltage and the high voltage of the voltage supply line 26. When the voltage on the column conductor 6 is high, the drive transistor 22 is turned off so that all current through the current sampling resistor 30 can be drained to the current drain 62. When driving the display element 2, the current drain 62 can be switched to open circuit so that no current is drawn through the second address transistor 60. In this way, the column conductors can be used to switch between phases of the address cycle whilst still enabling switching of the control transistors (the two address transistors and the two sampling transistors) to be controlled simultaneously by a shared control line.

Figure 6:
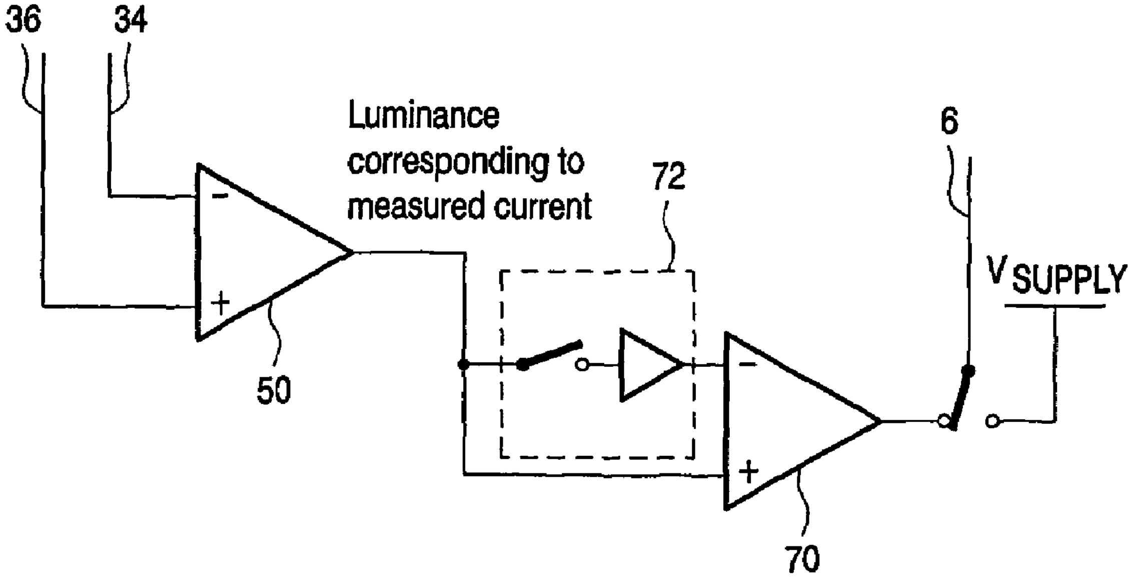
FIG. 6 shows the column driver architecture for a display using the pixel layout of FIG. 5.

FIG. 6 shows one example of possible circuitry in the column driver for processing the feedback signals on the feedback lines 34, 36 to provide the required gate voltage for the drive transistor 22. The voltage probe signals provided on the feedback lines 34, 36 are again provided to differential amplifier 50 with gain to provide a signal representing a measured luminance value. This measured luminance value is provided to one input of a second differential amplifier 70, and the other input of the amplifier 70 is provided from a sample and hold circuit 72. This sample and hold circuit 72 provides an output which is obtained during the calibration stage. Thus, when the circuit of FIG. 6 is used to drive the pixel, the second differential amplifier 70 is comparing a stored calibration value from the sample and hold circuit 72 with a measured luminance value from the first differential amplifier 50. As shown in FIG. 6, the column conductor 6 is not permanently connected to the output of the second differential amplifier 70. Instead, the column is switchable between the output of the amplifier 70 and the supply voltage $V_{SUPPLY}$ of the voltage supply line 26. As explained above, by switching the column to the supply voltage, the drive transistor 22 is turned off so that the calibration can be carried out.

In order to program a pixel, the column conductor 6 is switched to the supply voltage to turn off the drive transistor 22, as explained above. The address phase is initiated by switching the address conductor 4 to a low value, thereby turning on both address transistors 16, 60 as well as both sampling transistors 38, 40. A current source is used to drain the desired current from the current drain line 62 and this current is drawn through the current sampling resistor 30 and the second address transistor 60. During this time, the circuit of FIG. 6 uses the voltage probe measurements to derive a measured luminance value at the output of the first differential amplifier 50. This luminance value is sampled and held by circuit 72. During this phase, the output of the second differential amplifier 70 is floating, and the circuit is acting purely as a sample and hold circuit.

After the sample and hold operation, the current source is turned off and the current drain line 62 is switched to a high impedance state, so that no further current is drawn through the second address transistor 60. The column conductor 6 is then switched to the output of the circuit of FIG. 6, so that the feedback system operates to adjust the voltage on the column conductor 6. The circuit then operates in a similar manner to that of FIG. 4. However, the second differential amplifier 70 compares the feedback signal with the sampled and held value. Thus, the equilibrium is reached when the column conductor voltage gives rise to a measured luminance corresponding to the sampled value stored in the sample and hold circuit 72. Thus, the feedback circuit operates to provide a voltage on the column conductor 6 giving rise to the previously sampled current. At the end of the address phase, the address conductor 4 is high to switch off the address transistors as well as the sampling transistors. The storage capacitor 24 again stores the desired gate voltage of the drive transistor 22 and other pixels in the array can then be addressed.

This arrangement requires a current input to be sampled, but then maintains the benefit of voltage-addressing. In the example above, the required LED current is used as the calibration current, which is then matched to the real current flowing during the addressing phase. It is, instead, possible to calibrate the current sampling resistor 30 with a known fixed current, so that the calibration stage is essentially a measurement of the resistance. This resistance measurement would then be used to control the gain of the first differential amplifier 50 in the circuit of FIG. 4 to provide the required feedback characteristics. An alternative scheme working in this way will not be described in detail.

Figure 7:
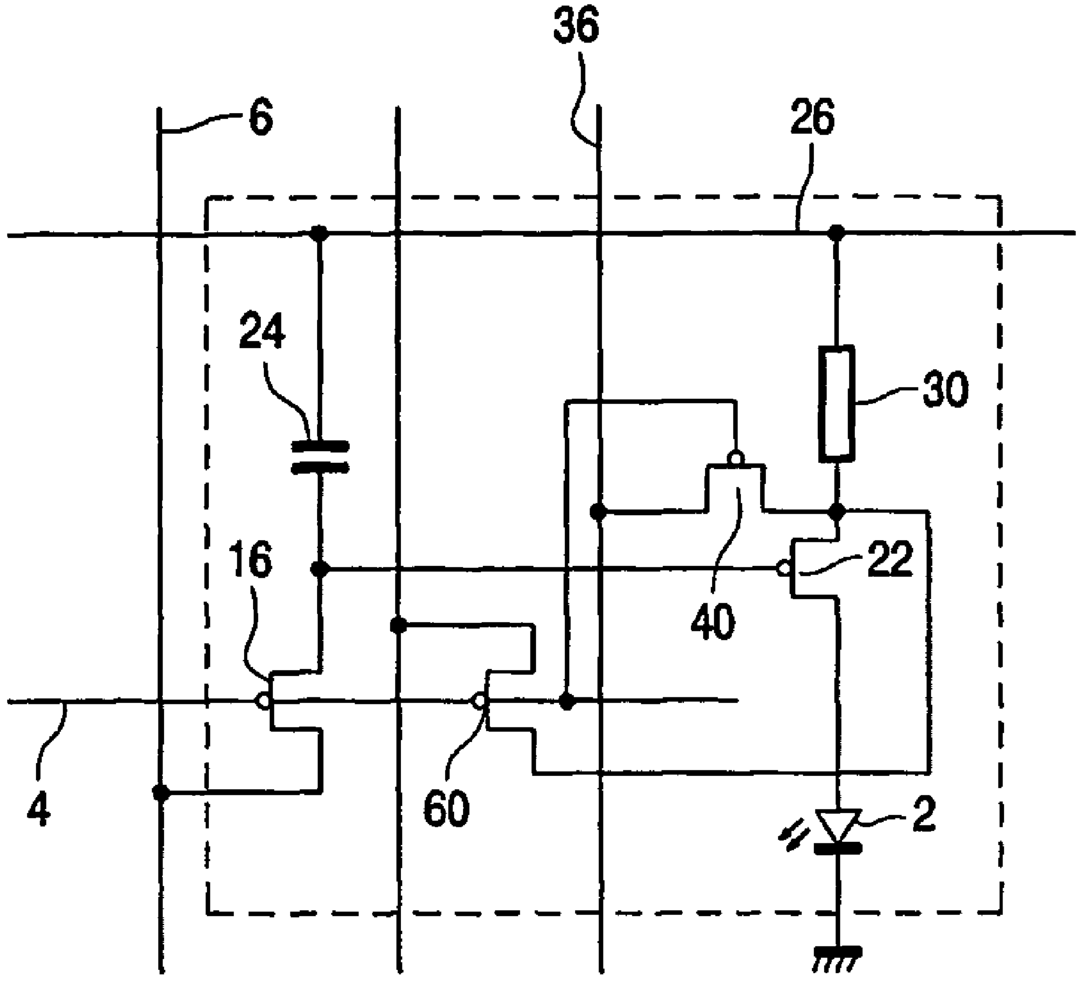
FIG. 7 shows a schematic diagram of a third example of pixel layout for a display device of the invention.

In the examples above, voltage probe measurements are taken for both ends of the current sampling resistor 30. This ensures that the feedback system operates correctly irrespectively of the voltage of the power supply line 26. As described earlier, there may be significant voltage drops along the power supply line 26 as a result of the currents drawn by the pixels in the row. However, if the resistance of the power supply line 26 is sufficiently small that these voltage drops are substantially less than the smallest voltage drop across the current sampling resistor 30, then measurement of the power supply line voltage at each pixel (which is essentially the operation of sampling transistor 38) may not be required. FIG. 7 shows a modification to the circuit of FIG. 5 in which the sampling transistor 38 and the feedback line 34 are removed. Instead, the voltage at the junction between the current sampling resistor 30 and the drive transistor 22 will uniquely define any given display element current.

The circuits above use PMOS drive transistors. There are also of course NMOS implementations.

In FIGS. 3, 5, and 7, the storage capacitor 24 is provided between the power supply line 26 and the gate of the drive transistor. It is also possible to put the storage capacitor (24) between the gate of the drive transistor (22) and the source terminal of the transistor (22). This would make little difference to the operation of the circuit. The example described above uses an analogue column driver implementation. However, the pixel circuits of the invention could also be used in conjunction with a digital driver architecture. A sample and hold part of the circuit could be implemented with an ADC-DAC for example. The resistor could be calibrated at power-up, using suitable memory store and processing capability. Thus, the processing of the feedback signals generated by the pixel circuits of the invention can be carried out in a variety of ways, not only with the analogue implementation described in detail above.

Various other modifications will be apparent to those skilled in the art.

The invention claimed is:

1. An active matrix electroluminescent display device comprising an array of display pixels, each pixel comprising:
- an electroluminescent (EL) display element;
- a drive transistor for driving a current through the display element;
- a current sampling resistor, wherein the EL display element, the drive transistor and the current sampling resistor are in series between first and second power lines;
- circuitry comprising at least one sampling transistor for providing one or more feedback signals representing the voltage drop across the current sampling resistor to at least one feedback line, wherein the circuitry comprises a first sampling transistor connected between one terminal of the current sampling resistor and a first said feedback line; and
- an address transistor, connected between a data input line and the gate of the drive transistor, the gates of the address transistor and the or each sampling transistor being controlled by a shared address line,
- wherein the display device further comprises processing means for processing pixel drive signals in dependence on the feedback signal or signals.

2. A device as claimed in claim 1, wherein the circuitry for providing a feedback signal or signals further comprises a second said sampling transistor connected between the other terminal of the current sampling resistor and a second feedback line.

3. A device as claimed in claim 1, wherein each pixel further comprises: a second address transistor, wherein the second address transistor is connected between the one terminal of the current sampling resistor and a current drain line.

4. A device as claimed in claim 3, wherein the second address transistor is controlled by the shared address line.

5. A device as claimed in claim 1, wherein the processing means comprises:
- a first amplifier which receives the feedback signal or signals and derives therefrom an output dependent on the current flowing through the current sampling resistor; and
- a second amplifier which receives the output dependent on the current flowing through the current sampling resistor and the pixel drive signal and provides a modified pixel drive signal.

6. A device as claimed in claim 1, wherein the processing means comprises:
- a first amplifier which receives the feedback signal or signals and derives therefrom an output dependent on the current flowing through the current sampling resistor;
- a sample and hold circuit for holding the output value; and
- a second amplifier for receiving the held output value and the output dependent on the current flowing through the current sampling resistor.

7. A device as claimed in claim 1, wherein each pixel further comprises:
- an address transistor, connected between a data input line and the gate of the drive transistor, wherein the gates of the address transistor and the or each sampling transistor are controlled by a shared address line, and
- wherein the processing means comprises:
  - a first amplifier which receives the feedback signal or signals and derives therefrom an output dependent on the current flowing through the current sampling resistor;
  - a sample and hold circuit for holding the output value; and
  - a second amplifier for receiving the held output value and the output dependent on the current flowing through the current sampling resistor, wherein the data input line is switchable between a power supply line voltage ($V_{SUPPLY}$) and the output of the second amplifier.

8. A device as claimed in claim 6, wherein the device is operable in two modes, the modes comprising:
- a first mode in which a desired pixel drive current is driven through the current sampling resistor and the second address transistor to the current drain line, and the output dependent on the current flowing through the current sampling resistor is stored; and
- a second mode in which a current is driven through the drive transistor and the EL display element and the output dependent on the current flowing through the current sampling resistor is provided to the second amplifier for comparison with the stored output value, the second amplifier providing the data input line voltage.

9. A method of addressing an active matrix electroluminescent display device comprising an array of display pixels, in which each pixel comprises an electroluminescent (EL) display element, a drive transistor for driving a current through the display element and a current sampling resistor in series with the EL display element and the drive transistor, the method comprising, for each pixel:
- applying a drive signal to the pixel representing a desired current;
- switching a shared data line to control sampling of a voltage on the terminals of the resistor in series with the EL display element to obtain a feedback signal representing the current flowing through the display element;
- switching a feedback line to control the sampling of the voltage on the terminals of the resistor in series with the EL display element to obtain the feedback signal representing the current flowing through the display element; and
- using the drive signal and the feedback signal to generate a modified pixel drive signal such that the current flowing is equal to the desired current.

10. A method as claimed in claim 9, wherein using the drive signal and the feedback signal comprises differentially amplifying the signals.

11. A method as claimed in claim 9, wherein sampling a voltage on the terminals of the resistor in series with the EL display element comprises tapping the voltage from each terminal to a differential amplifier.

12. A method as claimed in claim 9, wherein sampling a voltage on the terminals of a resistor in series with the EL display element comprises tapping the voltage from one terminal, and the voltage on the other terminal comprising a known supply voltage.

13. A method of addressing an active matrix electroluminescent display device comprising an array of display pixels, in which each pixel comprises an electroluminescent (EL) display element, a drive transistor for driving a current through the display element and a current sampling resistor in series with the EL display element and the drive transistor, the method comprising, for each pixel:

driving a desired current through the current sampling resistor and not through the display element;

switching a shared data line to control sampling of a voltage on one or more terminals of the current sampling resistor to obtain a feedback signal representing the voltage drop across the current sampling resistor;

switching a feedback line to control the sampling of the voltage on one or more terminals of the current sampling resistor to obtain the feedback signal representing the voltage drop across the current sampling resistor; and storing the feedback signal; and using the stored feedback signal as a feedback control signal for subsequently driving current through the display element by applying a voltage to the gate of the drive transistor, the feedback control signal being used to determine the gate voltage.

14. A method as claimed in claim 13, wherein using the stored feedback signal comprises applying the stored feedback signal and a second feedback signal during driving of the display element to a differential amplifier, and using the differential amplifier output to control the drive transistor.

15. A method as claimed in claim 14, wherein the second feedback signal is obtained by sampling a voltage on a said terminal of the current sampling resistor.

* * * * *